(12) United States Patent
Novick et al.

(10) Patent No.: US 10,901,864 B2
(45) Date of Patent: Jan. 26, 2021

(54) LIGHT-WEIGHT MIRROR CONTAINER

(71) Applicant: Pivotal Software, Inc., San Francisco, CA (US)

(72) Inventors: Ivan D. Novick, Sunnyvale, CA (US); Lawrence Hamel, Menlo Park, CA (US); Oz Basarir, San Francisco, CA (US); Goutam Tadi, Sunnyvale, CA (US)

(73) Assignee: Pivotal Software, Inc., San Francisco, CA (US)

( * ) Notice: Subject to any disclaimer, the term of this patent is extended or adjusted under 35 U.S.C. 154(b) by 124 days.

(21) Appl. No.: 16/027,195

(22) Filed: Jul. 3, 2018

(65) Prior Publication Data
US 2020/0012506 A1 Jan. 9, 2020

(51) Int. Cl.
*G06F 11/20* (2006.01)
*G06F 16/28* (2019.01)
*G06F 9/455* (2018.01)
*G06F 9/50* (2006.01)

(52) U.S. Cl.
CPC ...... *G06F 11/2033* (2013.01); *G06F 9/45558* (2013.01); *G06F 9/505* (2013.01);
(Continued)

(58) Field of Classification Search
CPC .... G06F 9/45558; G06F 9/505; G06F 9/5077; G06F 2009/4557; G06F 2009/45595;
(Continued)

(56) References Cited

U.S. PATENT DOCUMENTS 5,835,755 A 11/1998 Stellwagen, Jr.
6,374,262 B1 4/2002 Kodama
(Continued)

FOREIGN PATENT DOCUMENTS

WO WO2016101301 6/2016
WO WO2017062288 4/2017

OTHER PUBLICATIONS

PCT International Search Report and Written Opinion issued in International Application No. PCT/US2019/039833 dated Oct. 4, 2019, 17 pages.

*Primary Examiner* — Jacob D Dascomb
(74) *Attorney, Agent, or Firm* — Fish & Richardson P.C.

(57) ABSTRACT

Methods, systems, and apparatus, including computer programs encoded on computer storage media, for allocating a number of first containers to implement one primary segment instance each and a number of second containers to implement one mirror segment instance each. In one example system, the second containers are configured to have less computing resources than the first containers. The containers are distributed among a number of physical computers. The system receives an indication of a failure of a physical computer hosting a particular first container implementing a first primary segment instance. In response to receiving the indication, the system promotes a second mirror segment instance that is a mirror of the first primary segment instance to be a new primary segment instance. The system allocates additional resources to the particular second container implementing the promoted mirror segment instance.

20 Claims, 4 Drawing Sheets

(52) U.S. Cl.
CPC ........ *G06F 9/5077* (2013.01); *G06F 11/2069* (2013.01); *G06F 16/284* (2019.01); *G06F 2009/4557* (2013.01); *G06F 2009/45562* (2013.01); *G06F 2009/45595* (2013.01)

(58) Field of Classification Search
CPC ....... G06F 2009/45562; G06F 11/2069; G06F 16/284; G06F 11/2023; G06F 11/2028; G06F 11/2033; G06F 11/2048; G06F 11/2053
See application file for complete search history.

(56) References Cited

U.S. PATENT DOCUMENTS

| | | |
|---|---|---|
| 7,599,923 B2 | 10/2009 | Brown et al. |
| 7,779,008 B2 | 8/2010 | Dageville et al. |
| 9,164,864 B1 | 10/2015 | Novick et al. |
| 9,304,868 B2 | 4/2016 | Isaacson et al. |
| 9,934,107 B1* | 4/2018 | Chikkanayakanahally ................ G06F 11/1456 |
| 10,225,208 B1 | 3/2019 | Prahlad et al. |
| 2002/0049759 A1 | 4/2002 | Christensen |
| 2006/0080315 A1 | 4/2006 | Mitchell |
| 2007/0083574 A1 | 4/2007 | Garin, Jr. et al. |
| 2011/0060940 A1 | 3/2011 | Taylor et al. |
| 2011/0178984 A1 | 7/2011 | Talius et al. |
| 2012/0159523 A1 | 6/2012 | Kulkarni et al. |
| 2014/0298077 A1 | 10/2014 | Isaacson et al. |
| 2016/0203202 A1* | 7/2016 | Merriman ........... G06F 11/0709 714/20 |
| 2019/0340265 A1* | 11/2019 | Raman .................. G06F 9/5061 |

\* cited by examiner

LIGHT-WEIGHT MIRROR CONTAINER

BACKGROUND

This specification relates to massively parallel processing (MPP) relational databases.

A relational database organizes data into one or more relational tables of columns and rows with unique keys identifying each row. An individual row in a table represents an instance of a particular entity, and the columns in that row store values attributed to the instance. Rows in one table can be linked to rows in another table by including in one of the tables a column for the unique key of the linked row.

An MPP database is a database that is partitioned into multiple segments. The segments are queried by respective segment instances, which are computer programs that are executed by physical or virtual computing nodes referred to as segment nodes. Each segment node has its own storage and processing power. Each segment instance, at the direction of a master, can execute a portion of a query from a client device. The master collects the results from each segment instance and returns a final result to the client device.

Each segment instance, sometimes referred to as a primary segment instance, has a corresponding mirror segment instance that is a replica of the primary. The mirror segment instances provided redundancy to the MPP database. A primary segment instance and its corresponding mirror segment instance are generally hosted on different segment nodes so that if one of the segment nodes fails, the segment is not lost forever.

Generally, segment nodes of an MPP database operate at capacity with an assortment of both primary and mirror segment instances to optimize use of available hardware, which reduces costs. However, this approach has several drawbacks. If a segment host that hosts a particular primary segment instance fails, the corresponding mirror segment instance must take over the operations of the failed primary segment instance. This requires allocating more computing resources to the mirror segment instance. But because the segment host that hosts the mirror segment instance was previously operating at capacity, that segment host will now be overloaded. This degrades query speed and consistency. Until the failed computing node is revived, the MPP database performs poorly as a result of the overloaded state.

Once the failed segment host is revived, the MPP database must be rebalanced. That is, workload from the overloaded segment must be redistributed to the revived segment host. This can involve reinitiating the primary segment instances on the revived segment host and demoting the promoted mirror segment instances on the overloaded segment host. This rebalancing causes downtime during which clients cannot access the MPP database. As the MPP database grows larger, these problems are only compounded, because downtime events become more likely and last longer.

SUMMARY

This specification describes technologies for implementing primary and mirror segment instances of an MPP relational database using containers. In this specification, containers refer to isolated user-space instances that are implemented by operating-system-level virtualization. Containers share computing resources, e.g., memory or processing power, of the respective computing systems that host the containers. Computing systems can dynamically adjust resource allocation between containers as necessary.

Primary segment instances are segment instances that are actively queried, while mirror segment instances are replicas of the primary segment instances and provide redundancy for the MPP database. Each primary and mirror segment instance is implemented by a container.

A computing system that implements the MPP relational database described above can allocate more resources to the containers that implement primary segment instances than to the containers that implement mirror segment instances. When a client device sends a query to the MPP relational database, the database can respond to the query using only the primary segment instances. If a particular primary segment instance fails, its corresponding mirror segment instance is promoted to be a primary segment instance. The computing system also allocates more computing resources to the container implementing that newly promoted segment instance.

The subject matter described in this specification can be implemented in particular embodiments so as to realize one or more of the following advantages. Allocating less resources to containers that implement mirror segment instances, which is possible because mirror segment instances are not used for query processing, reduces energy consumption and associated costs.

By implementing a single primary segment instance or mirror segment instance per container, the database experiences no performance degradation when a container hosted on a particular physical computer fails because other physical computers do not have to handle a larger database load. Instead, the mirror segment instance corresponding to the primary segment instance implemented by the failed container is simply promoted to be a primary segment instance. Thereafter, the system can dynamically allocate additional computing resources to the container that implements the promoted segment instance. Because physical computers do not have to handle a larger database load, there is no speed degradation. Additionally, if the failure of the physical computer is resolved, the former primary segment instance can be demoted to a mirror segment instance, and the container that hosts the demoted segment instance can be allocated fewer computing resources, which optimizes computing resource usage.

Rebalancing of physical computers hosting containers is also not required. Rebalancing is not required because newly promoted mirror segment instances remain primary segment instances even if failures are resolved. As new failures occur, the system merely promotes more mirror segment instances to be primary segment instances. The system also allocates new containers from a pool of containers to implement mirror segment instances. Because rebalancing is not required, database downtime is reduced, and availability is improved.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes technologies for implementing primary and mirror segment instances of an MPP relational database using containers. Primary segment instances are segment instances that are actively queried, while mirror segment instances are replicas of the primary segment instances and provide redundancy for the MPP database. Both the primary segment instances and the mirror segment instances are hosted by containers rather than by virtual machines or physical computers.

Both containers and virtual machines are partitions of ordinary computing systems that are allocated computing resources, e.g., memory, processing power, and so on, of the respective computing systems that host them. However, containers differ from virtual machines in several respects. First, a container hosted on a particular physical computer can share operating system resources with other containers hosted on the same physical computer. Therefore, it is possible to run multiple containers with only a single operating system. On the other hand, different virtual machines do not share operating system resources. In other words, to run two different virtual machines on the same physical computer, running two full operating systems is typically required.

Second, a computing system can allocate different levels of computing resources to different containers running on the same physical computer. In addition, the allocations can be dynamically changed. In contrast, a virtual machine cannot easily change resource allocations for programs on the virtual machine.

A computing system that implements the MPP relational database described above can allocate more resources to the containers that implement primary segment instances than to the containers that implement mirror segment instances. When a client device provides a query to the MPP relational database, the database can respond to the query using only primary segment instances. If a particular primary segment instance or its container fails, the computing system can promote its corresponding mirror segment instance to be a primary segment instance. The computing system can also dynamically allocate additional computing resources to the container implementing the new primary segment instance.

Distributing segment instances and allocating computing resources as described above reduces energy consumption of the MPP relational database, which also reduces its operating costs.

Figure 1:
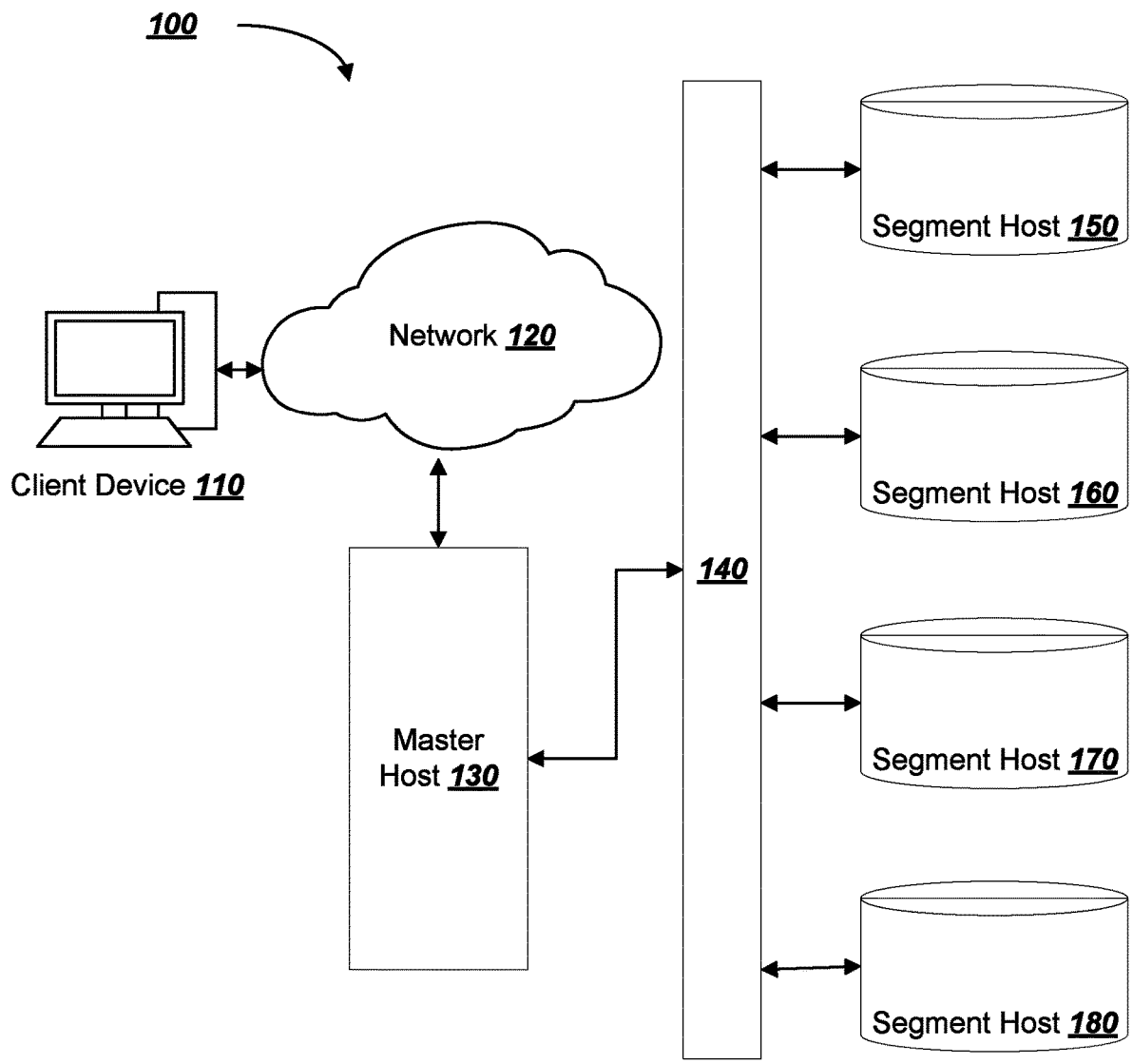
FIG. 1 is a diagram of an example system.

FIG. 1 is a diagram of an example system 100 in which a client device and an MPP relational database communicate and exchange information over a network.

The client device 110 can be a server, a desktop computer, a laptop computer, a tablet, a mobile device, or another similar computing device. Although only a single client device is depicted in FIG. 1, the system 100 can support many client devices operating anywhere in the world.

The client device 110 can connect to a master host 130 over a network 120. The network 120 can be any appropriate combination of communications networks. For example, the network 120 can be a local area network (LAN) that connects computers in a limited area such as a residence, school, laboratory, or office building. LANs include Ethernet and Wi-Fi networks. The network 120 can also be a larger network, including a wide area network (WAN) or the Internet.

The master host 130 is one or more computers in one or more locations that control a number of segment instances. The master host 130 can include a global database catalog that stores information about all of the tables in the MPP relational database and the distribution policy of each table. In other words, the global database catalog can store information about how the tables in the MPP relational database are distributed among segment hosts. The global database catalog can be a hash table, search tree, or other similar table lookup structure.

The segment hosts 150-180 are connected to the master host 130 through a switch 140. Each segment host is a node of the MPP relational database. Each node is a physical computer, e.g., server, that hosts one or more containers that implement primary and/or mirror segment instances. Programs, e.g., segment instances, running inside a particular container only have access to the computing resources allocated to that container, but the system can dynamically reallocate those resources as required.

Each container hosted in segment hosts 150-180 can implement a single segment instance. In other words, each container implements either a primary segment instance or a mirror segment instance. The system allocates more computing resources to containers implementing primary segment instances than to containers implementing mirror segment instances. For example, the system can allocate more processing power, memory, or network bandwidth to the containers implementing the primary segment instances. The system does so because only the primary segment instances are used for query processing, which requires those additional computing resources. The mirror segment instances, on the other hand, are not used for query processing. Consequently, they require less computing resources.

A particular segment host can host containers that implement both primary and mirror segment instances. Alternatively, a particular segment host can host containers that implement only primary segment instances or only mirror segment instances.

The Linux kernel feature "cgroups" can be used to control resource allocation between the containers. Cgroups provides resource limiting, prioritization, accounting, and control functionality. Resource limiting involves specifying that particular containers cannot exceed a configured memory limit. Prioritization involves specifying that particular containers are allocated a larger share of central processing unit (CPU) utilization. Accounting involves measuring the resource usage of a container. And control involves freezing processes performed by a container.

The client device 110 can query the MPP relational database to retrieve particular data from it. In response to a query, the master host 130 creates a distributed query plan that is sent to all segment hosts and executed in parallel. The segment hosts return a result to the master host 130, which provides the result to the client device 110.

Figure 2:
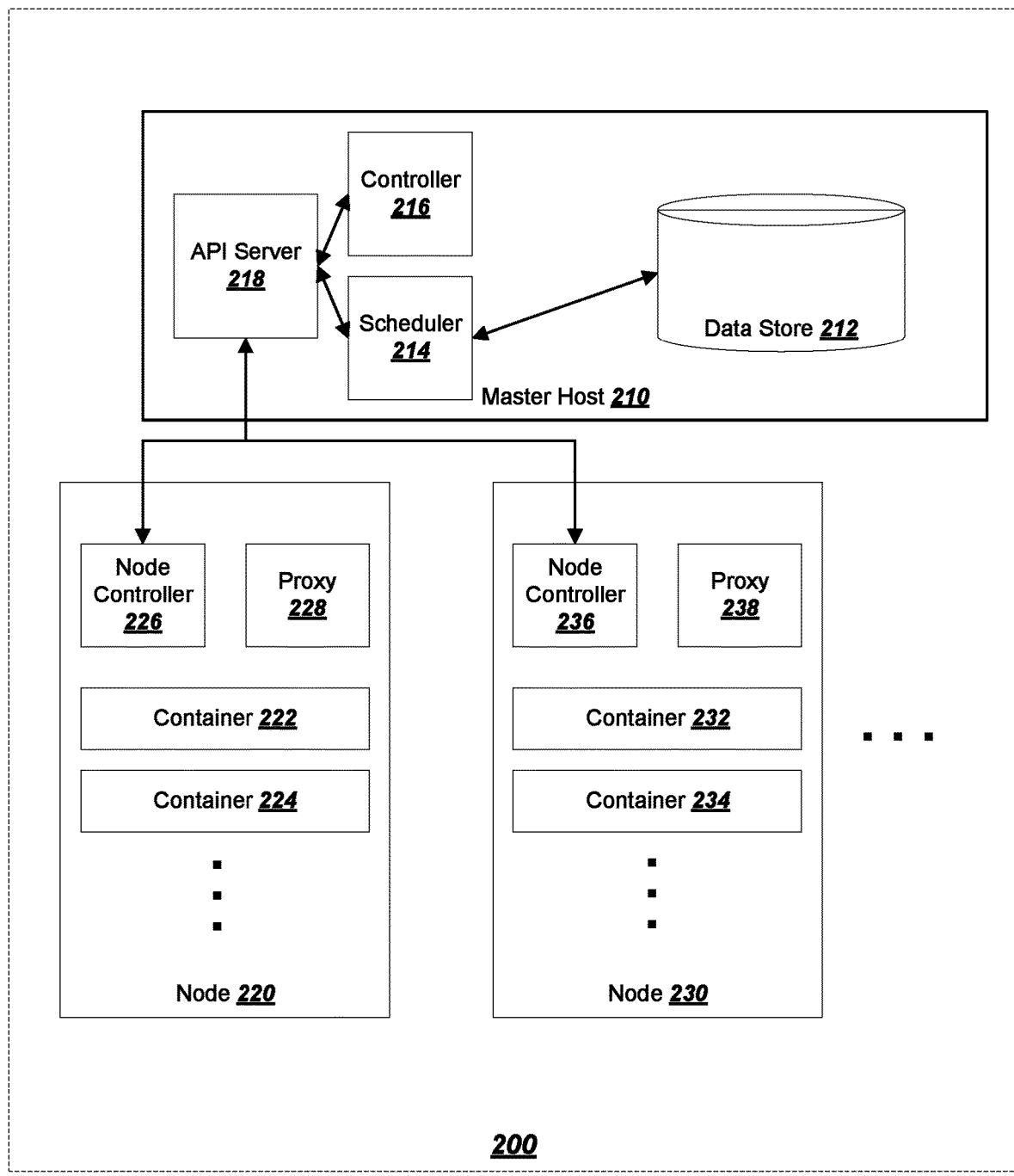
FIG. 2 is a diagram of an example architecture of an MPP relational database.

FIG. 2 is a diagram of an example architecture of an MPP relational database 200. The example architecture 200 includes a master host 210 similar to the master host 130 of FIG. 1. The master host 210 has a data store 212. The data store 212 can store the configuration of data in one or more nodes of the MPP relational database 200. In other words, the data store 212 can specify which nodes store which segment instances. More specifically, the data store 212 can specify particular containers in which segment instances are implemented. Changes in the data store 212 correspond to changes in the configuration of data in the nodes. For example, certain segment instances might be exchanged between nodes of the database, or between containers in a particular node. Such a change would be reflected in the data store 212. The data store 212 can be a hash table, search tree, or other similar table lookup structure.

The master host 210 also includes a scheduler 214. The scheduler 214 is a process that can select nodes that unscheduled segment instances should be hosted on based on resource availability. The scheduler 214 can also select mirror segment instances that should be promoted to be primary segment instances when failures occur.

The scheduler 214 can track resource utilization on each node to ensure that workload is not scheduled in excess of available computing resources. For this purpose, the scheduler 214 must know the resource requirements, resource availability and a variety of other user-provided constraints and policy directives. In essence, the scheduler 214 can match resource supply to workload demand. The scheduler 214 is configured to communicate with and update the data store 212 when it selects a node and a container in which to implement an unscheduled segment instance.

The scheduler 214 can also select resource allocations for the containers hosted on the nodes based on policy directives. For example, a policy directive might specify that containers that implement primary segment instances should be allocated more computing resources than containers that implement mirror segment instances. The scheduler 214 can decide how to allocate resources to carry out the policy directive.

The master host 210 also includes a controller 216 that is configured to communicate with the nodes through an API server 218 to create, update, and delete the resources it manages. That is, the controller 216 can carry out the resource allocation decisions made by the scheduler 214. The API server 218 provides both internal and external interface to the MPP relational database 200.

As mentioned above, the MPP relational database 200 also includes a number of nodes, including nodes 220 and 230. The nodes 220 and 230 correspond to the segment hosts 150-180 depicted in FIG. 1. Each node is a physical computer, e.g., server. Each node hosts a number of containers. For example, node 220 hosts containers 222 and 224, among others. As previously described, each container implements a single segment instance, e.g., a single primary segment instance or a single mirror segment instance.

Each node includes a node controller. For example, node 220 includes a node controller 226. The node controllers are responsible for maintaining the state of each node. That is, the node controllers manage the implementation, promotion, and resource allocation of the containers as directed by the controller 216. For example, in response to a command from the controller 216, the node controller 226 can promote a mirror segment instance implemented in the container 222 to a primary segment instance and allocate more computing resources to that container.

Finally, each node also includes a proxy. For example, node 220 includes proxy 228. A proxy acts as an intermediary for requests to its particular node. It is responsible for routing traffic to an appropriate container hosted in the node based on the IP and port number of the incoming request.

Figure 3:
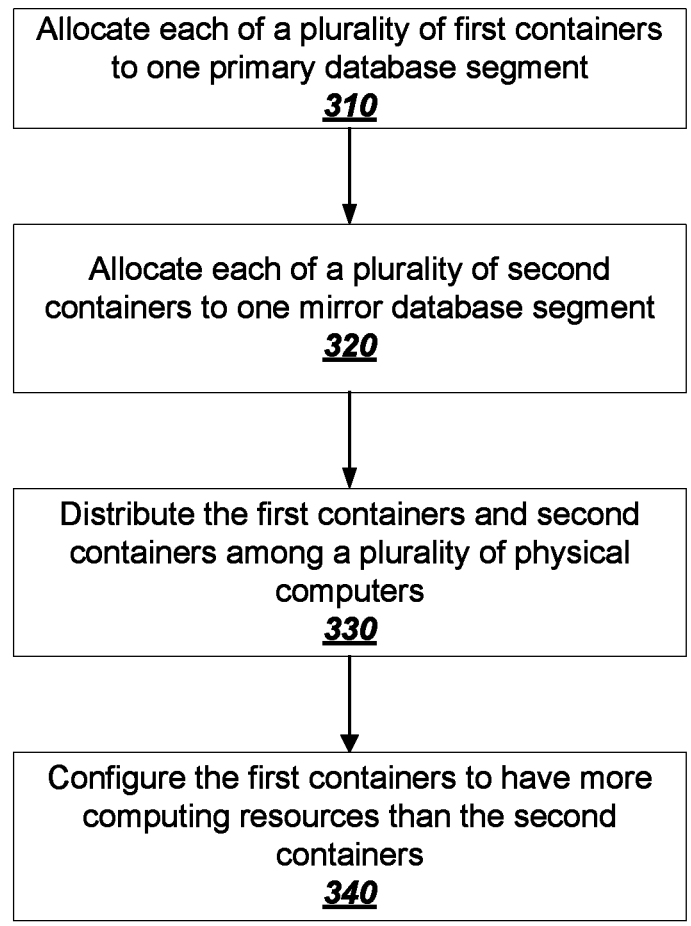
FIG. 3 is a flow chart of an example process for allocating segment instances among a number of containers.

FIG. 3 is a flow chart of an example process 300 for allocating segment instances of an MPP database among a number of containers. For convenience, the process 300 will be described as being performed by a system of one or more computers located in one or more locations. For example, a database master, e.g., the master host 210 of FIG. 2, appropriately programmed, can perform the process 200.

The system allocates a plurality of first containers to implement one primary segment instance each (310). Segment instances are computer programs that implement partitions of an MPP database. In particular, primary segment instances are segment instances that are used to process queries from client devices.

The system also allocates a plurality of second containers to implement one mirror segment instance each (320). Each primary segment instance has one or more corresponding mirror segment instances. A mirror segment instance is substantially the same as its corresponding primary segment instance. In other words, it is a replica of the primary segment instance. The mirror segment instances do not actively process queries from client devices. Rather, the mirror segment instances merely add redundancy to the MPP database. As such, the containers that implement mirror segment instances require less computing resources than the containers that implement the primary segment instances.

Each first container implements at most one primary segment instance, and each second container implements at most one mirror segment instance.

The system allocates the first containers and second containers among a number of physical computers (330). In some implementations, both first containers and second containers are allocated on the same physical computer. In other implementations, first containers and second containers are implemented on separate physical computers. A particular first container implementing a primary segment instance and a second container implementing a corresponding mirror segment instance are generally implemented on separate physical computers in case one of the two physical computers fails.

The system configures the second containers to have less resources than the first containers (340). As mentioned above, such a configuration is possible because only the primary segment instances—which are implemented by the first containers—are used to process queries. Because the mirror segment instances are not used to process queries, they require less computing resources. Configuring the second containers to have less resources than the first containers can involve allocating less processing power, memory size, or network bandwidth to the second containers.

Figure 4:
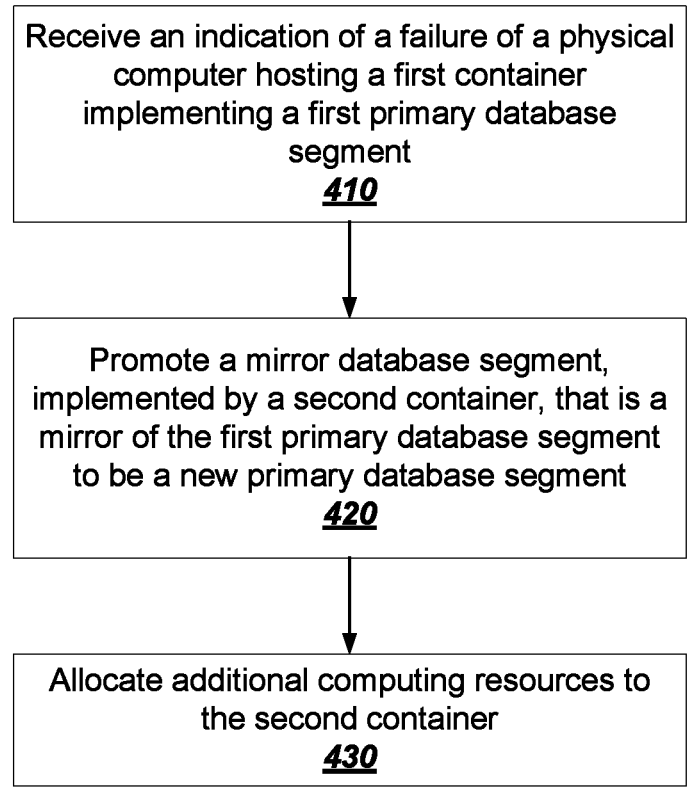
FIG. 4 is a flow chart of an example process for promoting mirror segment instances to primary segment instances.

FIG. 4 is a flow chart of an example recovery process 400 for promoting mirror segment instances to primary segment instances when a physical computer fails. For convenience, the process 400 will be described as being performed by a system of one or more computers located in one or more locations.

The system receives an indication of a failure of a physical computer hosting a first container implementing a first primary segment instance (410).

After such a failure, a query of the first primary segment instance would fail. So the system promotes a mirror segment instance, implemented by a second container, that is a mirror of the first primary segment instance to be a new primary segment instance (420). As described in reference to FIG. 1, the system can use the Linux kernel "cgroups" to accomplish this task. In some implementations, after the system promotes the mirror segment instance to be a primary segment instance, the system allocates a new second container to implement a mirror segment instance of the new primary segment instance. The new second container is retrieved from a pool of available containers.

After the system promotes the mirror segment instance to be a new primary segment instance, the system can allocate additional computing resources to the second container implementing the new primary segment instance (430).

Allocating additional resources to the second container implementing the new primary segment instance can involve determining one or more primary levels of computing resources allocated to each of containers implementing primary segment instances. For example, the system can determine the amount of processing power, memory, or network bandwidth allocated to the containers implementing primary segment instances. The system can then modify the allocation of resources to the container implementing the new primary segment instance to have at least as many computing resources as the other containers implementing primary segment instances.

After performing the recovery process of FIG. 4, the system need not rebalance the allocation of containers that implement primary segment instances among the physical computers. Instead, the system can simply reallocate computing resources among containers on a particular physical computer. As new failures occur, the system merely promotes mirror segment instances to be primary segment instances and allocates new second containers from a pool of containers to implement mirror segment instances.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
allocating a plurality of first containers to implement one primary segment instance each and assigning the primary segment instances to handle queries for respective partitions of a database;
allocating a plurality of second containers to implement one mirror segment instance each, each mirror segment instance being a mirror of one of the primary segment instances, including configuring each second container of the plurality of second containers to have less computing resources than each first container of the plurality of first containers;
distributing the plurality of first containers and the plurality of second containers among a plurality of physical computers;
receiving an indication of a failure of a physical computer hosting a particular first container implementing a first primary segment instance;
in response to receiving the indication, performing a recovery process to instantiate a replacement for the first primary segment instance, including performing operations comprising:
promoting a second mirror segment instance that is a mirror of the first primary segment instance to be a new primary segment instance, wherein the second mirror segment instance is implemented by a particular second container of the plurality of second containers, and
allocating additional resources to the particular second container.

Embodiment 2 is the method of embodiment 1, further comprising:
allocating a new second container to be a mirror segment instance of the new primary segment instance.

Embodiment 3 is the method of any one of embodiments 1-2, wherein allocating additional resources to the particular second container comprises:
determining one or more primary levels of computing resources allocated to each of the plurality of first containers; and
modifying allocations of one or more computing resources of the particular second container to have at least the one or more primary levels of computing resources.

Embodiment 4 is the method of any one embodiments 1-3, wherein each first container of the plurality of first containers implements at most one primary segment instance.

Embodiment 5 is the method of any one of embodiments 1-4, wherein each second container of the plurality of second containers implements at most one mirror segment instance.

Embodiment 6 is the method of any one of embodiments 1-5, wherein performing the recovery process comprises instantiating the new primary segment instance without rebalancing the allocation of other primary segment instances to the plurality of physical computers.

Embodiment 7 is the method of any one of embodiments 1-6, wherein promoting the second mirror segment instance and allocating additional resources to the particular second container does not include relaunching the particular second container.

Embodiment 8 is the method of any one of embodiments 1-7, wherein allocating additional resources to the particular second container comprises allocating one or more of additional processing power, memory size, or network bandwidth.

Embodiment 9 is the method of any one of embodiments 1-8, wherein distributing the plurality of first containers and the plurality of second containers among a plurality of physical computers comprises allocating one or more first containers and one or more second containers on the same physical computer.

Embodiment 10 is a system comprising: one or more computers and one or more storage devices storing instructions that are operable, when executed by the one or more computers, to cause the one or more computers to perform the method of any one of embodiments 1-9.

Embodiment 11 is one or more computer storage media storing instructions that are operable, when executed by one or more computers, to cause the one or more computers to perform the method of any one of embodiments 1-9.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
one or more computers and one or more storage devices storing instructions that are operable, when executed by the one or more computers, to cause the one or more computers to perform operations comprising:
allocating a plurality of first containers to implement one primary segment instance each and assigning the primary segment instances to handle queries for respective partitions of a database;
allocating a plurality of second containers to implement one mirror segment instance each, including configuring each second container of the plurality of second containers to have less computing resources than each first container of the plurality of first containers, wherein each second container implements a respective mirror segment instance configured to maintain a respective mirror segment for a respective primary segment used by one of the plurality of first containers;
distributing the plurality of first containers and the plurality of second containers among a plurality of physical computers;
receiving an indication of a failure of a physical computer hosting a first container implementing a first primary segment instance;
in response to receiving the indication, performing a recovery process to instantiate a replacement for the first primary segment instance, comprising:
promoting a second container implementing a second mirror segment instance to be a primary segment instance using a mirror segment corresponding to a primary segment of the first primary segment instances implemented by the plurality of first containers, wherein the second mirror segment instance is implemented by the second container of the plurality of second containers, wherein after being promoted to be the primary segment instance, the second container is configured to process query requests using the mirror segment, and
allocating additional resources to the second container in response to the second container being promoted to be the primary segment instance.

2. The system of claim 1, wherein the operations further comprise:
allocating a new second container to implement a mirror segment instance of the second mirror segment instance of the promoted second container.

3. The system of claim 1, wherein allocating additional resources to the second container comprises:
determining one or more primary levels of computing resources allocated to each of the plurality of first containers; and
modifying allocations of one or more computing resources of the second container to have at least the one or more primary levels of computing resources such that in response to the second container being promoted to be the primary segment instance, the second container has at least the allocated levels of computing resources allocated to each first container implementing a corresponding primary segment.

4. The system of claim 1, wherein each first container of the plurality of first containers implements at most one primary segment instance.

5. The system of claim 1, wherein each second container of the plurality of second containers implements at most one mirror segment instance.

6. The system of claim 1, wherein performing the recovery process comprises instantiating the second mirror segment instance to be a primary segment instance without rebalancing the allocation of other primary segment instances to the plurality of physical computers.

7. The system of claim 1, wherein the promoting and the allocating comprise promoting the second container and allocating the additional resources to the second container without relaunching the second container.

8. The system of claim 1, wherein allocating additional resources to the second container comprises allocating one or more of additional processing power, memory size, or network bandwidth.

9. The system of claim 1, wherein distributing the plurality of first containers and the plurality of second containers among a plurality of physical computers comprises allocating one or more first containers and one or more second containers on the same physical computer.

10. A method comprising:
allocating a plurality of first containers to implement one primary segment instance each and assigning the primary segment instances to handle queries for respective partitions of a database;
allocating a plurality of second containers to implement one mirror segment instance each, including configuring each second container of the plurality of second containers to have less computing resources than each first container of the plurality of first containers, wherein each second container implements a respective mirror segment instance configured to maintain a respective mirror segment for a respective primary segment used by one of the plurality of first containers;
distributing the plurality of first containers and the plurality of second containers among a plurality of physical computers;
receiving an indication of a failure of a physical computer hosting a first container implementing a first primary segment instance;
in response to receiving the indication, performing a recovery process to instantiate a replacement for the first primary segment instance, comprising:
promoting a second container implementing a second mirror segment instance to be a primary segment instance using a mirror segment corresponding to a primary segment of the first primary segment instances implemented by the plurality of first containers, wherein the second mirror segment instance is implemented by the second container of the plurality of second containers, wherein after being promoted to be the primary segment instance, the second container is configured to process query requests using the mirror segment, and
allocating additional resources to the second container in response to the second container being promoted to be the primary segment instance.

11. The method of claim 10, further comprising:
allocating a new second container to implement a mirror segment instance of the second mirror segment instance of the promoted second container.

12. The method of claim 10, wherein allocating additional resources to the second container comprises:
determining one or more primary levels of computing resources allocated to each of the plurality of first containers; and
modifying allocations of one or more computing resources of the second container to have at least the one or more primary levels of computing resources such that in response to the second container being promoted to be the primary segment instance, the second container has at least the allocated levels of computing resources allocated to each first container implementing a corresponding primary segment.

13. The method of claim 10, wherein each first container of the plurality of first containers implements at most one primary segment instance.

14. The method of claim 10, wherein each second container of the plurality of second containers implements at most one mirror segment instance.

15. The method of claim 10, wherein performing the recovery process comprises instantiating the second mirror segment instance to be a primary segment instance without rebalancing the allocation of other primary segment instances to the plurality of physical computers.

16. The method of claim 10, wherein the promoting and the allocating comprise promoting the second container and allocating the additional resources to the second container without relaunching the second container.

17. The method of claim 10, wherein allocating additional resources to the second container comprises allocating one or more of additional processing power, memory size, or network bandwidth.

18. The method of claim 10, wherein distributing the plurality of first containers and the plurality of second containers among a plurality of physical computers comprises allocating one or more first containers and one or more second containers on the same physical computer.

19. One or more non-transitory computer storage media storing instructions that are operable, when executed by one or more computers, to cause the one or more computers to perform operations comprising:
allocating a plurality of first containers to implement one primary segment instance each and assigning the primary segment instances to handle queries for respective partitions of a database;
allocating a plurality of second containers to implement one mirror segment instance each, including configuring each second container of the plurality of second containers to have less computing resources than each first container of the plurality of first containers, wherein each second container implements a respective mirror segment instance configured to maintain a respective mirror segment for a respective primary segment used by one of the plurality of first containers;
distributing the plurality of first containers and the plurality of second containers among a plurality of physical computers;
receiving an indication of a failure of a physical computer hosting a first container implementing a first primary segment instance;
in response to receiving the indication, performing a recovery process to instantiate a replacement for the first primary segment instance, comprising:
promoting a second container implementing a second mirror segment instance to be a primary segment instance using a mirror segment corresponding to a primary segment of the first primary segment instances implemented by the plurality of first containers, wherein the second mirror segment instance is implemented by the second container of the plurality of second containers, wherein after being promoted to be the primary segment instance, the second container is configured to process query requests using the mirror segment, and
allocating additional resources to the second container in response to the second container being promoted to be the primary segment instance.

20. The one or more non-transitory computer storage media of claim 19, wherein the operations further comprise:
allocating a new second container to implement a mirror segment instance of the second mirror segment instance of the promoted second container.

* * * * *